United States Patent
Bromberg

(10) Patent No.: US 10,085,120 B1
(45) Date of Patent: Sep. 25, 2018

(54) COPY AIDED GEOLOCATION

(71) Applicant: BAE SYSTEMS Information and Electronic Systems Integration Inc., Nashua, NH (US)

(72) Inventor: Matthew C. Bromberg, Leominster, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 15/813,373

(22) Filed: Nov. 15, 2017

(51) Int. Cl.
| | |
|---|---|
| *H04W 24/00* | (2009.01) |
| *H04W 4/02* | (2018.01) |
| *H04B 17/21* | (2015.01) |
| *G01S 5/02* | (2010.01) |
| *H04B 17/27* | (2015.01) |
| *H04W 84/00* | (2009.01) |

(52) U.S. Cl.
CPC .......... *H04W 4/023* (2013.01); *G01S 5/0215* (2013.01); *G01S 5/0278* (2013.01); *H04B 17/21* (2015.01); *H04B 17/27* (2015.01); *H04W 84/005* (2013.01)

(58) Field of Classification Search
None
See application file for complete search history.

(56) References Cited

U.S. PATENT DOCUMENTS

| | | | | |
|---|---|---|---|---|
| 5,515,378 A | * | 5/1996 | Roy, III | H01Q 1/246 370/334 |
| 7,233,285 B2 | | 6/2007 | Struckman | |
| 2007/0087689 A1 | * | 4/2007 | Alles | G01S 5/0221 455/11.1 |
| 2010/0321241 A1 | * | 12/2010 | Janosky | G01S 3/785 342/444 |

OTHER PUBLICATIONS

Agee, "Fast Acquisition of Burst and Transient Signals Using a Predictive Adaptive Beamformer", ARGOSystems Advanced Systems Group, pp. 1-7, Aug. 1987.
Agee, "The Copy/DF Approach to Signal-Specific Emitter Location", Radix Technologies, Inc., IEEE, pp. 994-999, 1991.
Agee, "The Least-Squares CMA: A New Technique for Rapid Correction of Constant Modulus Signals", ICASSP 86, Tokyo, pp. 953-956, IEEE 1986.
Agee et al., "The SCORE Approach to Blind Adaptive Signal Extraction: An Application of the Theory of Spectral Correlation", IEEE Xplore, pp. 277-282, 1988.

\* cited by examiner

*Primary Examiner* — Erika Washington
(74) *Attorney, Agent, or Firm* — Davis & Bujold, PLLC

(57) ABSTRACT

The system and method of copy aided geolocation in a cochannel environment. The plurality of emitter signals are detected using a multichannel antenna array, separated into subbands based on frequency ranges using a channelizer, and are further processed using copy weights, property restoral algorithms, and maximum likelihood calculations. The multichannel antenna array may be mounted to a mobile platform and the calculations may assume that the signal of (Continued)

interest is non-Gaussian, but the remainder of emitter signals is combined into another signal that is assumed to be Gaussian. The method and system provides geolocation results that adhere to the Cramer-Rao bound.

12 Claims, 8 Drawing Sheets

$$\mathcal{L}_k = -\ln(\det(\mathbf{R}_{i_k i_k}\pi)) - tr\left(\mathbf{R}_{i_k i_k}^{-1}\left(\widehat{\mathbf{R}}_{\mathbf{x}_k \mathbf{x}_k} - 2\operatorname{Re}\left(\alpha_k^* \widehat{\mathbf{a}}_{sk} \mathbf{a}_k^H\right) + \alpha_k \mathbf{a}_k^H |\alpha_k|^2\right)\right)$$

$$= \sum_{k=1}^{K} \ln\left(1 - \beta_k + \frac{\left|\mathbf{a}_{xk}^H \widehat{\mathbf{a}}_{xk}\right|^2}{\|\mathbf{a}_{xk}\|^2}\right)$$

Whitened steering vector estimates: $\quad \widehat{\mathbf{a}}_{xk} \equiv \mathbf{R}_x^{-H} \widehat{\mathbf{a}}_{sk}$ Whitened array manifold vectors $\quad \mathbf{a}_{xk} \equiv \mathbf{R}_x^{-H} \mathbf{a}_k,$ $\widehat{\mathbf{R}}_{\mathbf{x}_k \mathbf{x}_k} \equiv \frac{1}{N} \mathbf{X}_k^H \mathbf{X}_k$ $\widehat{\mathbf{a}}_k \equiv \frac{1}{\mathbf{s}_k^H \mathbf{s}_k} \mathbf{X}_k^H \mathbf{s}_k$ $r_{ss}(k) \equiv \frac{1}{N} \mathbf{s}_k^H \mathbf{s}_k$ $\mathbf{a}_k \equiv \mathbf{a}(\mathbf{z}_k).$ Sufficient statistics all determined as a byproduct of signal detection

FIG. 2

COPY AIDED GEOLOCATION

FIELD OF THE DISCLOSURE

The present disclosure relates to geolocation and more particularly to an improved method of performing geolocation in an environment with interfering signals.

BACKGROUND OF THE DISCLOSURE

Previous instantiations of geolocation systems rely on using an unambiguous array to develop a series of lines of bearing (LOB) from a variety of collection points along a flight path of a collection system. These LOB are processed through a geolocation algorithm such as Stansfield or Gauss-Newton to calculate a target's location. In the event of a cochannel signal environment, multi-signal Angle-of-Arrival (AoA) algorithms such as the MUSIC algorithm can be employed to compute the various directions of arrival for the cochannel signals, along with ad-hoc modifications to the Stansfield algorithm to associate LOB with the individual emitters to arrive at a geolocation solution for the multiple targets.

SUMMARY OF THE DISCLOSURE

One aspect of the present disclosure is a method of geolocation in a cochannel signal environment comprising detecting a plurality of emitter signals over a range of frequencies via a multichannel antenna array; receiving the plurality of emitter signals via a digital receiver; separating the plurality of emitter signals into subbands based on frequency ranges via a channelizer; processing, via at least one processor, the plurality of emitter signals utilizing property restoral algorithms, wherein the property restoral algorithms comprise constant modulus, angle modulation, burstiness and/or voice; calculating, via the processor, copy weights for the plurality of emitter signals; applying, via the processor, the copy weights to the plurality of emitter signals; iterating, via the processor, the application of the property restoral algorithms to the plurality of emitter signals; computing, via the processor, a maximum likelihood for the plurality of emitter signals, wherein a largest value calculated is indicative of a signal of interest and a location for the emitter of the signal of interest; and reporting, via the processor, the results from the maximum likelihood computation to a user or system component.

One embodiment of the method of geolocation in a cochannel signal environment is wherein the multichannel antenna array is mounted to a moving platform. In some cases, computing a maximum likelihood for the plurality of emitter signals further comprises utilizing platform location and attitude data corresponding to detection of the plurality of emitter signals.

Another embodiment of the method of geolocation in a cochannel signal environment further comprises calibrating the multichannel antenna array.

In certain cases, the plurality of emitter signals is assumed to comprise a signal of interest and another signal comprised of all other signals detected in the cochannel signal environment.

Yet another embodiment of the method of geolocation in a cochannel signal environment is wherein the location for the emitter of the signal of interest adheres to a lower Cramer-Rao bound than correlation interferometry geolocation.

Another aspect of the present disclosure is a system for geolocation in a cochannel signal environment comprising a multichannel antenna array configured to detect a plurality of emitter signals over a range of frequencies; a digital receiver for receiving the plurality of emitter signals; a channelizer for separating the plurality of emitter signals into subbands based on frequency ranges; at least one processor configured to utilize property restoral algorithms to process the plurality of emitter signals, wherein the property restoral algorithms comprise constant modulus, angle modulation, burstiness and/or voice; calculate copy weights for the plurality of emitter signals; apply the copy weights to the plurality of emitter signals; iterate the application of the property restoral algorithms to the plurality of emitter signals; compute a maximum likelihood for the plurality of emitter signals, wherein a largest value calculated is indicative of a signal of interest and a location for the emitter of the signal of interest; and report the results from the maximum likelihood computation to a user or a system component.

One embodiment of the system for geolocation in a cochannel signal environment is wherein the multichannel antenna array is mounted to a moving platform. In some cases, computing a maximum likelihood for the plurality of emitter signals, via the processor, further comprises utilizing platform location and attitude data corresponding to detection of the plurality of emitter signals.

Another embodiment of the system for geolocation in a cochannel signal environment further comprises calibrating the multichannel antenna array off-line.

In certain cases, the plurality of emitter signals is assumed to comprise a signal of interest and another signal comprised of all other signals detected in the cochannel signal environment.

Yet another embodiment of the system for geolocation in a cochannel signal environment is wherein the location for the emitter of the signal of interest adheres to a lower Cramer-Rao bound than correlation interferometry geolocation.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 2 shows one embodiment of the maximum likelihood derivation system for copy-aided geolocation according to the principles of the present disclosure.

DETAILED DESCRIPTION OF THE DISCLOSURE

Figure 1:
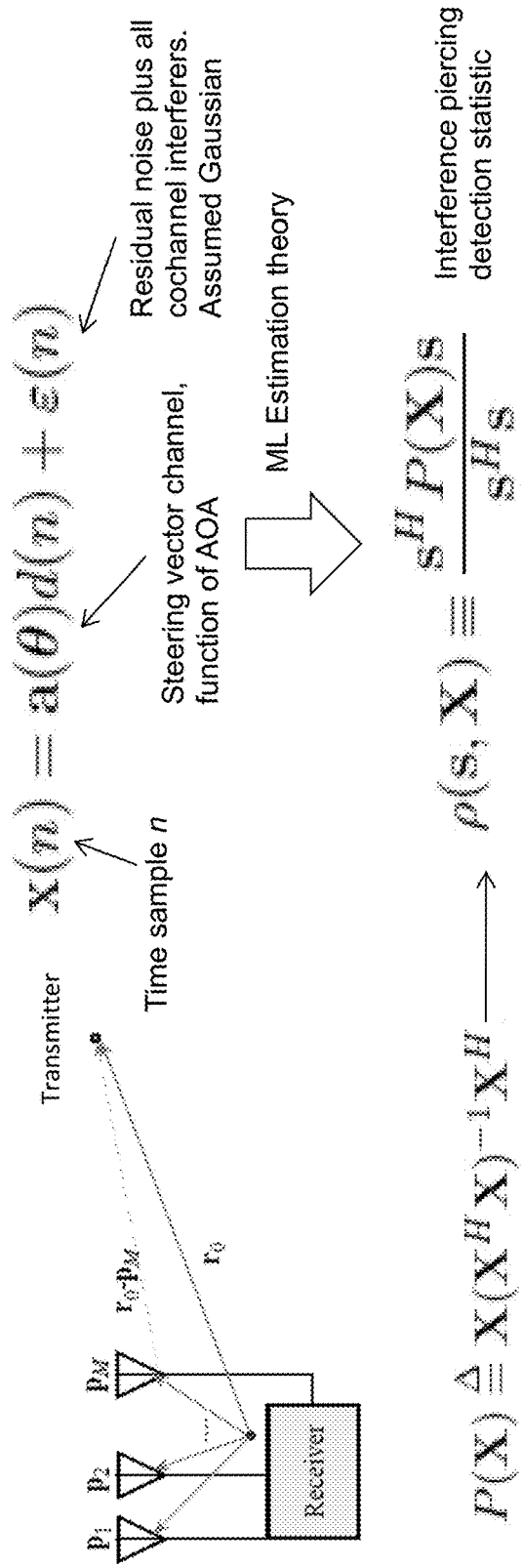
FIG. 1 shows one embodiment of the statistical modeling system according to the principles of the present disclosure.

Previous methods of identifying location provide a basic framework for performing geolocation or direction finding (DF), based on maximum likelihood (ML) principles. As shown by others, a copy-aided direction finding (DF) algorithm solution outperforms solutions such as MUSIC, especially when signal separation is small relative to the beamwidth of the collection array. Correlation interferometer geolocation (CIGL) solutions deal with the geolocation solution for potentially ambiguous arrays using a likelihood surface calculation that integrates away false ambiguities over the course of a collection flight, leaving an unbiased target solution that adheres to the maximum likelihood (ML) estimator. The algorithms described herein are specialized to yield improved results as compared to such methods as the Correlation Interferometry and Geolocation technique (CIGL) or the Hound-dog technique.

Cochannel interference is a common problem in reconnaissance, especially for airborne platforms. These systems often operate in cellular environments or other types of networks where multiple co-channel transceivers are present. Given an array of antennas it is important to be able to geolocate targets of interest based on weak signal properties all while in a noisy environment as well as in a hostile environment with jammers and the like.

A surveillance system can be deployed in environments where the targets of interest have not been fully characterized, or where it is prohibitive to do so. In such systems it is necessary to be able to classify and geolocate targets based on weak signal properties such as bauded signals, burstiness, known constellations, angle modulation, or other non-Gaussian features. Burstiness is a characteristic of communications involving data that is transmitted intermittently (in bursts) rather than as a continuous stream. A burst is a transmission involving a large amount of data sent in a short time. When bursts are a repeated, dependable behavior in some type of transmission, the subject in question is said to exhibit burstiness. A burst, or transient signal is where the transaction is broken up into a series of short duration bursts, each one containing a subset of the modulated symbols. Oftentimes, individual bursts are sent on different frequencies, a technique known as frequency hopped spread spectrum. To exploit this property, the assumption is that the interference environment has stationary second order statistics (i.e. autocovariance matrix) prior to and during the target signal burst. An example of this type of background environment would be broadcast signals that are continuous. The limits to which this holds are often a function of collection platform motion, but usually <<1 second in duration.

Techniques that rely simply on sampling the receiver energy will not work effectively in cochannel interference environments. In one embodiment, geolocation techniques such as the method of the present disclosure, namely Copy-Aided Geolocation, or CAGL are employed. This technique extends the successful copy-aided paradigm to the geolocation problem. By modeling the received energy as consisting of two components, a known signal and an interference signal, and by presuming interference is Gaussian, but the signal of interest (SOI) is not, a closed form solution can be obtained for the maximum likelihood function, which depends on the position of the SOI.

The likelihood function of the present disclosure is evaluated over a grid of position hypotheses to find the peak likelihood. One can also use local search techniques such as conjugate gradient or quasi-Newton techniques, for compute bound systems. The present system requires a calibrated array much like most angle-based geolocation techniques.

CAGL greatly outperforms pure direction finding (DF) based geolocation techniques such as the Stansfield algorithm by an order of magnitude or more even in non-interference environments. In interference environments it greatly outperforms correlation interferometry geolocation (CIGL), which fails completely as the interference power increases.

In contrast to CIGL, the method of the present disclosure, CAGL, has proven itself in several airborne collection environments where cochannel cellular interference was present. In those cochannel interference environments, all other algorithms failed to work effectively. Numerical experiments have shown that CAGL actually asymptotically adheres to the optimal Cramer Rao Bound, a mathematical performance limit of how good an estimator can be in an ideal situation. Thus, for sufficient SNR or collection samples one cannot actually perform better than CAGL for obtaining a position estimate for a SOI.

In addition to the defense applications, CAGL has several commercial applications. These include cell phone localization for towers equipped with multiple antennas or indoor localization for RFID tagged products or appropriately equipped communications devices, and the like. The commercial applications may require that the object being localized is in the RF range of multiple base station transceivers. However the performance is considered to be orders of magnitude better than existing solutions. Additionally, this technique can be used synergistically with calibration using quaternion scattering models as this has been used as an enabling technology in the calibration of the antenna arrays needed for CAGL.

The present disclosure represents an improved technique for geolocation capable of superior performance in the presence of interference. The general framework assumes that there is one emitter (L=1), and that all other emitters are subsumed within the interference noise process. As a result the process does not assume that the background noise is white, but that it is colored and shaped by the interfering emitters. For better results, we assume L>1, if there are interferers, however, for the ML algorithm this results in a more difficult, higher dimensional optimization problem. In certain embodiments of the present disclosure, the initial assumptions include 1) $R_{ikik}$ (the interference autocovariance matrix) can be estimated or modeled, so that it is assumed known 2) the number of emitters, L, is 1; and the steering vector is modeled by $a_k = \alpha_k a(z_k)$. Starting with these assumptions, the likelihood function for the k'th collect is written as, $$L_{xk} = det(R_{ikik}\pi)^{-N} etr(-R_{ikik}^{-1}(X_k^H X_k - 2Re X_k^H s_k a_k^H + a_k s_k^H s_k a_k^H))$$

Eq. 1

The normalized log-likelihood is defined by $L_k \equiv 1/N \ln(L \times k)$ hence $$L_k = -\ln(\det(R_{ikik}\pi)) - tr(R_{ikik}^{-1}(\hat{R}_{xkxk} - 2Re(r_{ss}(k) a_k^*\hat{a}_k a_k^H) + a_k a_k^H r_{ss}(k)|a_k|^2))$$  Eq. 2 where $$\hat{R}_{xkxk} \equiv 1/N X_k^H X_k$$

$$\hat{a}_k \equiv 1/s_k^H s_k (X_k^H s_k)$$

$$r_{ss}(k) \equiv 1/N\, s_k^H s_k$$

$$a_k \equiv a(z_k)$$

Now optimizing over the unknown complex scalar $\alpha_k$. The first order necessary conditions yield $$\partial L_k/\partial \alpha_k^* = r_{ss}(k) a_k^H R_{ikik}^{-1} \hat{a}_k - \alpha_k r_{ss}(k) a_k^H R_{ikik}^{-1} a_k = 0,$$

$$\alpha = a_k^H R_{ikik}^{-1} \hat{a}_k / a_k^H R_{ikik}^{-1} a_k$$

Substituting back into Eq. 2 gives, $$L_k = -\ln(\det(R_{ikik}\pi)) - tr(R_{ikik}^{-1} R_{xkxk}) + r_{ss}(k)|a_k^H R_{ikik}^{-1}\hat{a}_k|^2/a_k^H R_{ikik}^{-1} a_k$$  Eq. 3

The total log likelihood function over all collects is then defined by summing the $L_k$ over k to obtain $$L = \sum_{k=1}^{k} r_{ss}(k) |a^H(z_k) R_{ikik}^{-1} \hat{a}_k|^2 / a^H(z_k) R_{ikik}^{-1} a(z_k)$$  Eq. 4

$$= \sum_{k=1}^{k} |a^H(z_k) R_{ikik}^{-1} \hat{a}_{sk}|^2 / a^H(z_k) R_{ikik}^{-1} a(z_k)$$  Eq. 5 where we have suppressed additive constants that do not depend on the position vector parameter $z_{kl}$.

The best performing single target solution estimates $\hat{a}_k$, $r_{ss}(k)$ and $R_{ikik}$ via a separate blind signal copy algorithm for each block. The copy algorithm exploits well known signal properties such as constant modulus, burstiness or cyclostationarity, as needed. Examples of copy algorithms exploiting these properties are known in the literature. By training copy weights for unknown signals based on training against these properties, the estimated copy stream is used to estimate the target signal power, steering vector, and the associated interference covariance. Depending on the signal assumptions, Eq. 4 will simplify.

One embodiment of the present disclosure involves the use of the copy-aided geolocation derivation. Using Eq. 3, it is possible to derive the conventional copy-aided direction finding approach and extend it to handle geolocation. This has the advantage of being interference piercing while adhering to a lower Cramer-Rao bound (CRB) than standard CIGL.

Copy aided processing allows separation of cochannel signals into individual copy streams, one per emitter. This capability for separation of targets permits the geolocation and tracking of multiple co-channel emitters. The derivation starts by writing Eq. 2 as, $$L_k = -\ln(\det(R_{ikik}\pi)) - tr(R_{ikik}^{-1}(\hat{R}_{xkxk} - 2Re(\alpha_k^* \hat{a}_{sk} a_k^H) + a_k a_k^H |\alpha_k|^2))$$

where sqrt($r_{ss}(k)$) is absorbed into $\alpha_k$ and another factor of sqrt($r_{ss}(k)$) is absorbed into $\hat{a}_k$ to yield $\hat{a}_{sk}$. The vector equivalent of completing the square yields, $$L_k = -\ln(\det(R_{ikik}\pi)) - tr(R_{ikik}^{-1}(\hat{R}_{xkxk} - \hat{a}_{sk} a_{sk}^H + (\alpha_k a_k - \hat{a}_{sk})(\alpha_k a_k - \hat{a}_{sk})^H))$$  Eq. 6

$$= -M\ln(\pi) + \ln(\det(R_{ikik}^{-1})) - tr(R_{ikik}^{-1}(\hat{R}_{ikik}) + \xi\xi^H))$$

where $$\xi \equiv \alpha_k a_k - \hat{a}_{sk}$$  Eq. 7

$$\hat{R}_{ikik} \equiv \hat{R}_{xkxk} - \hat{a}_{sk} a_{sk}^H$$  Eq. 8

The copy-aided approach absorbs all of the co-channel interferers into the interference vector whose covariance matrix $R_{ikik}$ is assumed to be unknown. Next, optimization over this unknown matrix is completed. The first order necessary conditions are, $$\partial L_k/\partial R_{ikik}^{-1} = R_{ikik} - (\hat{R}_{ikik} + \xi\xi^H) = 0.$$

Substituting back into Eq. 6 yields, $$L_k = -M \ln(\pi e) - \ln(\det(\hat{R}_{ikik} + \xi\xi^H))$$

Using the two matrix identities det (AB)=det (A) det (B) and det (I+AB)=det (I+BA) the following equation is obtained, $$L_k = -M \ln(\pi e) - \ln(\det(\hat{R}_{ikik})) - \ln(1 + \xi^H \hat{R}_{ikik}^{-1} \xi).$$  Eq. 9

Now, optimization over $\alpha_k$ by minimizing $\xi^H \hat{R}_{ikik}^{-1} \xi$ over $\alpha_k$ is conducted. The necessary conditions are, $$a_k^H \hat{R}_{ikik}^{-1}(\alpha_k a_k - \hat{a}_{sk}) = 0,$$

which implies, $$\alpha_k = a_k^H \hat{R}_{ikik}^{-1} \hat{a}_{sk}/a_k^H \hat{R}_{ikik}^{-1} a_k.$$

This permits the likelihood function in Eq. 9 to be written as, $L_k = -M \ln(\pi e) - \ln (\det (\hat{R}_{ikik})) - \ln(1 + \hat{a}_k^H \hat{R}_{ikik}^{-1} \hat{a}_{sk} - (|a_k^H \hat{R}_{ikik}^{-1} \hat{a}_{sk}|^2 a_k^H \hat{R}_{ikik}^{-1} a_k)).$ One way to compute these quantities is to downdate the Cholesky factor $R_{xk}$ of $\hat{R}_{ikik}$ using Eq. 8 to obtain the Cholesky factors of $\hat{R}_{ikik}$, $R_{ik}$. The log determinant of $\hat{R}_{ikik}$ is then easily calculated as twice the sum of the logs of the absolute value of the diagonal elements of $R_{ik}$. Also, the generalized inner product can be computed as, $$u^H \hat{R}_{ikik}^{-1} v = (R_{ik}^{-H} u)^H (R_{ik}^{-H} v).$$

Since these inner products need to be computed over $a_k$'s evaluated over many positions, it is more efficient to explicitly compute the inverse $R_{ik}^{-H}$, which will be a lower triangular matrix.

Another approach, however, simplifies the likelihood function further by using Woodbury's identity for the inverse, $$\hat{R}_{ikik}^{-1} = \hat{R}_{xkxk}^{-1} + (1/1 - a_{sk}^H \hat{R}_{xkxk}^{-1} \hat{a}_{sk}) \hat{R}_{xkxk}^{-1} \hat{a}_{sk} \hat{a}_{sk}^H \hat{R}_{xkxk}^{-1}.$$

Using the intermediate calculations, $$\hat{R}_{ikik}^{-1} \hat{a}_{sk} = 1/1 - \beta_k (\hat{R}_{xkxk}^{-1} \hat{a}_{sk})$$

$$a_k^H \hat{R}_{ikik}^{-1} \hat{a}_k = a_k^H \hat{R}_{xkxk}^{-1} a_k + 1/1 - \beta_k (|a_k^H \hat{R}_{xkxk}^{-1} \hat{a}_{sk}|^2)$$

$$\beta_k = \hat{a}_{sk}^H \hat{R}_{xkxk}^{-1} \hat{a}_{sk}$$

one can write, $$L_k = -M\ln(\pi e) - \ln(\det(\hat{R}_{xkxk})) - \ln\left(1 - \left(|a_k^H \hat{R}_{xkxk}^{-1} \hat{a}_{sk}|^2\right)\right/$$

-continued $$((1-\beta_k)a_k^H \hat{R}_{xkxk}^{-1} a_k + |a_k^H \hat{R}_{xkxk}^{-1} \hat{a}_{sk}|^2))$$

$$= -M\ln(\pi e) - \ln(\det(\hat{R}_{xkxk})) - \ln((1-\beta_k)a_k^H \hat{R}_{xkxk}^{-1} a_k)/$$

$$((1-\beta)a_k^H \hat{R}_{xkxk}^{-1} a_k + |a_k^H \hat{R}_{xkxk}^{-1} \hat{a}_{sk}|^2))$$

$$= -M\ln(\pi e) - \ln(\det(\hat{R}_{xkxk})) - \ln((1-\beta_k)/((1-\beta_k)+\beta_k \kappa_k))$$

where $\kappa_k$ is the standard copy-aided DF objective function given by, $$\kappa_k = |a_k^H \hat{R}_{xkxk}^{-1} \hat{a}_{sk}|^2 / (a_k^H \hat{R}_{xkxk}^{-1} a_k \hat{a}_{sk}^H \hat{R}_{xkxk}^{-1} \hat{a}_{sk})$$

$$= |a_{xk}^H \hat{a}_{xk}|^2 / \|a_{xk}\|^2 \|\hat{a}_{xk}\|^2$$

$$= |a_k^H w_k|^2 / (a_k^H \hat{R}_{xkxk}^{-1} a_k w_k^H \hat{R}_{xkxk} w_k)$$

where $$\hat{a}_x \hat{a}_{xk} = R_x^{-H} \hat{a}_{sk}$$

$$a_{xk} = R_x^{-H} a_k.$$

$R_x$ is the Cholesky factor of $\hat{R}_{xkxk}$, and the copy weights are given asymptotically by $w_k = \hat{R}_{xkxk}^{-1} \hat{a}_k r_{ss}(k)$. The form of $\kappa_k$ that is dependent on the copy weights is sometimes convenient since copy weights can be derived from a variety of different blind techniques, and additionally one can compute, $$\beta_k = (1/r_{ss}(k)) w_k^H \hat{R}_{xkxk} w_k.$$

If superfluous constants that do not depend on $a_k$ are thrown out, the copy-aided geolocation function can be written as, $L_k = \ln(1+\gamma_k \kappa_k)$, where $\gamma_k = \beta k/(1-\beta k)$ is an estimate of the output signal to interference noise power (SINR) for collect k. The likelihood function is further normalized to be between 0 and 1 by noting that the maximal value of $\kappa_k$ is 1. Thus, the maximum value of the log likelihood L is, $L^* = \Sigma_{k=1}^k \ln(1+\gamma_k)$.

Thus, the normalized spectrum value is given by, $$L = \sum_{k=1}^k \ln(1+\gamma_k \kappa_k) - L_*$$

$$= \sum_{k=1}^k \ln((1+\gamma_k \kappa_k)/(1+\gamma_k))$$

$$= \sum_{k=1}^k \ln(1-\beta_k + \beta_k \kappa_k)$$

$$= \sum_{k=1}^k \ln(1-\beta_k + (|a_{xk}^H \hat{a}_{xk}|^2 / \|a_{xk}\|^2)).$$

Referring to FIG. 1, one embodiment of the statistical modeling system according to the principles of the present disclosure is shown. More specifically, the received signal is present in co-channel interference. In some cases, the signal has a known training signal or an exploitable signal property (e.g. constant modulus, cazac codes, cyclic prefix etc.). In one embodiment, the process of geolocation begins with the standard narrow band antenna model and the channel is assumed to be a complex multiply. This is the basic receive channel model assumed when there is not significant multipath (i.e. receive multiple copies of the same signal from environment scatterers). So the received signal is just an attenuated, phase rotated version of the transmit signal (A*exp(j*omega), or a single complex number).

The narrow band assumption breaks down in multipath channels. In some cases, there are lots of multipath signals for wideband signals and for ground collects. A multipath model is described in subsequent paragraphs. Multipath is a phenomenon in the physics of waves whereby a wave from a source travels to a detector via two or more paths and, under the right condition, the two (or more) components of the wave interfere. Essentially, coherent waves that travel along two different paths will arrive with phase shift, hence interfering with each other.

Still referring to FIG. 1, certain embodiments of the system use leading edge detection peak to filter out multipath and restore the narrow band model. In FIG. 1, the transmitted signal arrives at the receive array through multiple paths, being scattered by reflectors, usually near either the transmitter, or on the receive platform. The signal arriving at the array will then be time delayed from the signal arriving directly from the transmitter, usually incurring an additional phase and amplitude change from the direct signal. The equation shows the signal of interest received by the system through the antenna array. The received data is the combination of the target signal (the product of d(n) (the received "modulated symbol" and a direction (represented by the steering vector a(θ)). Noise and interfering signals are added in to create the total received data. The ML detection statistic that is exploited is for processing shown beneath, with s being the estimated received signal from the copy process (i.e. wH*X). How we get this estimated signal stream is a function of which exploitable property (constant modulus, etc. is used, as described). This represents a quick summary of what is exploited in the "Copy Aided" approach.

Referring to FIG. 2, one embodiment of the maximum likelihood derivation system of copy-aided geolocation according to the principles of the present disclosure is shown. More specifically, the methodology of the present disclosure provides interference piercing geolocation and shows the initial likelihood function followed by the reduced form of the final CAGL likelihood function. The whitened steering vector and whitened manifold vector are definitions of some of the terms in the larger equation.

$$\mathcal{L}_k = -\ln(\det(R_{i_k i_k} \pi)) - tr(R_{i_k i_k}^{-1}(\hat{R}_{x_k x_k} - 2\text{Re}(\alpha_k^* \hat{a}_{sk} a_k^H) + a_k a_k^H |\alpha_k|^2))$$

$$= \sum_{k=1}^{K} \ln\left(1 - \beta_k + \frac{|a_{xk}^H \hat{a}_{xk}|^2}{\|a_{xk}\|^2}\right)$$

In some cases, the log likelihood function is written for collection block k. The process is maximized over unknown nuisance parameters to obtain a final concentrated form. There, the signal output $\beta_k$ is incorporated as the interference noise power (SINR) $(1-\beta_k)$, for collect k. The CAGL likelihood is optimized over the geolocation surface to arrive at a geolocation solution for the target signal. That is, the values are computed at a set of points on the earth (or at offset altitudes of interest) as the collection system moves. The maximum value that is computed corresponds to the target location.

Figure 3B:
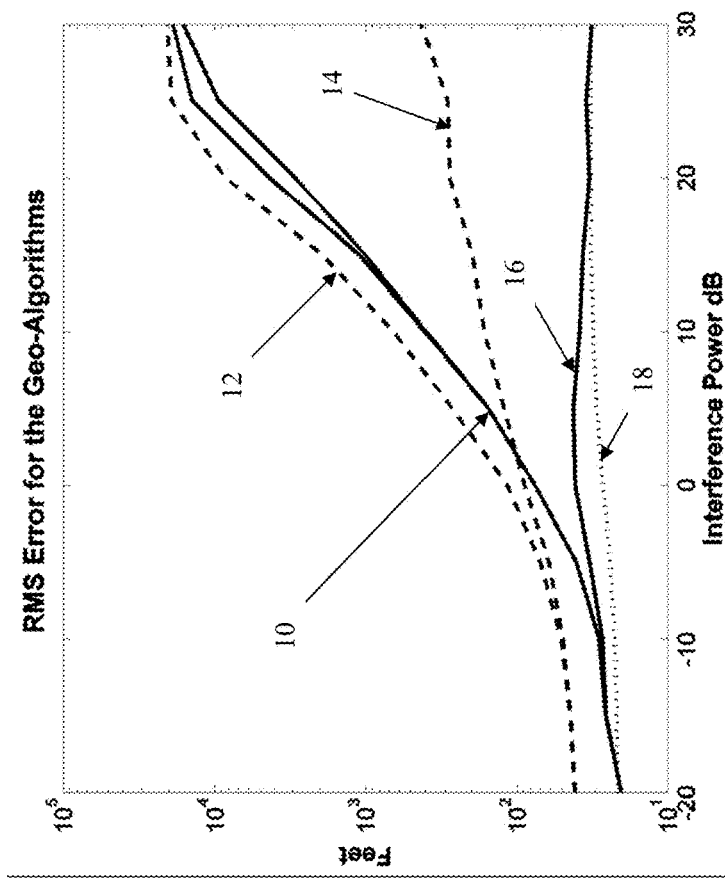
FIG. 3B shows a performance trial for one embodiment of the present disclosure.
Figure 3A:
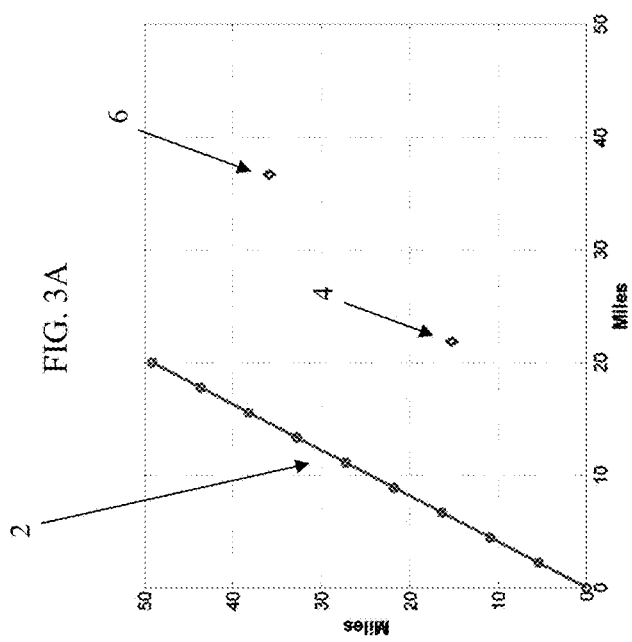
FIG. 3A shows a performance trial for one embodiment of the present disclosure.

Referring to FIG. 3A, a performance trial for one embodiment of the present disclosure is shown. More specifically, the trial comprised a liner flight path 2 and a two emitter collect 4, 6. In one case, the interference power was increased. FIG. 3A shows a collection profile with 2 cochannel emitters at points 4 and 6. Line 2 shows the collection platform which passed by the 2 emitters in a straight line trajectory. The dot markers in line (2) indicate points at which the two emitters were collected and processed. A series of trials with increasing interferer power levels were executed and processed using each of the four processing techniques; Correlation Interferometer DF with Stansfield Emitter location, the CIGL Algorithm, Copy Aided DF with Stansfield Emitter Location, and CAGL methodology of the present disclosure.

Referring to FIG. 3B, a performance trial for one embodiment of the present disclosure is shown for the data collection in FIG. 3A. FIG. 3B shows Root Mean Square Error (RMS) in feet of each geolocation algorithm as a function of relative interference power (in dB) over the collection profile. At minimal interference level (−20 dB), all algorithms perform reasonably well. CIGL (line 12) and CAGL (line 16) both adhere to optimal performance as denoted by the CR-bound (line 18), whereas CIDF/Stansfield (line 12) and copy aided DF/Stansfield (line 10) have some excess geolocation error. As the interference level is increased, however, only CAGL maintains optimal geolocation performance relative to the CR-bound line, the other algorithms begin to fail as can be seen by the increase in geolocation RMS error. For example, at around −10 dB interference power only the CAGL technique retains the near optimal performance. At around 10 db interference power, there is a significant performance difference as noted. The test also showed that CAGL adheres asymptotically to the Cramer Rao Bound.

Figure 4:
FIG. 4 represents results of a performance trial according to the principles of the present disclosure.

Referring to FIG. 4, an example of a geolocation result using the CAGL algorithm is shown. The platform collection route is depicted on the image (as balloons) along with the true location of the target (as +) along with the geolocation result provided by the CAGL algorithm of the present disclosure (as ▨).

Figure 5:
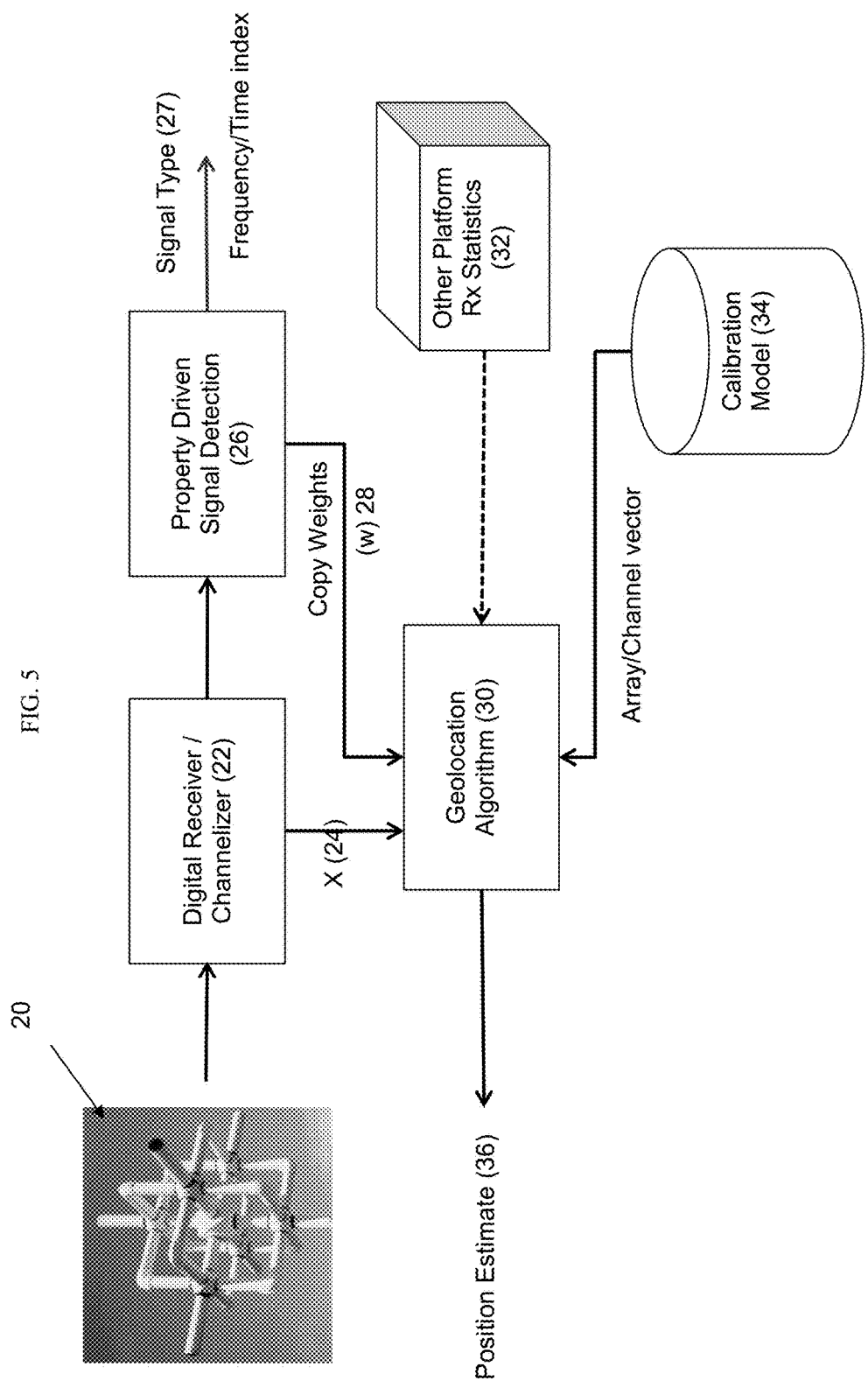
FIG. 5 shows a high level block diagram of one embodiment of the copy aided geolocation system of the present disclosure.

Referring to FIG. 5, a high level block diagram of one embodiment of the system of the present disclosure is shown. A multi-channel antenna 20 and receiver system, such as a digital receiver, is used to divide a frequency band into a number of frequency channels 22 such as by a channelizer. Each of these sub-channels is processed for signals of interest using property driven signal detection techniques 26 such as the property restoral algorithms. Copy streams are further analyzed for signal type and tracking purposes 27. Copy weights 28 and multichannel data 24 are provided to the geolocation algorithm, along with platform location and attitude data 32 corresponding to the signal collection events. The geolocation algorithm 30, using the collected data for each signal 24, along with a calibration database 34 corresponding to the aforementioned receiver array 20 computes the CAGL likelihood surface and develops a position estimate 36 for each of the target emitters that are being tracked.

Figure 6:
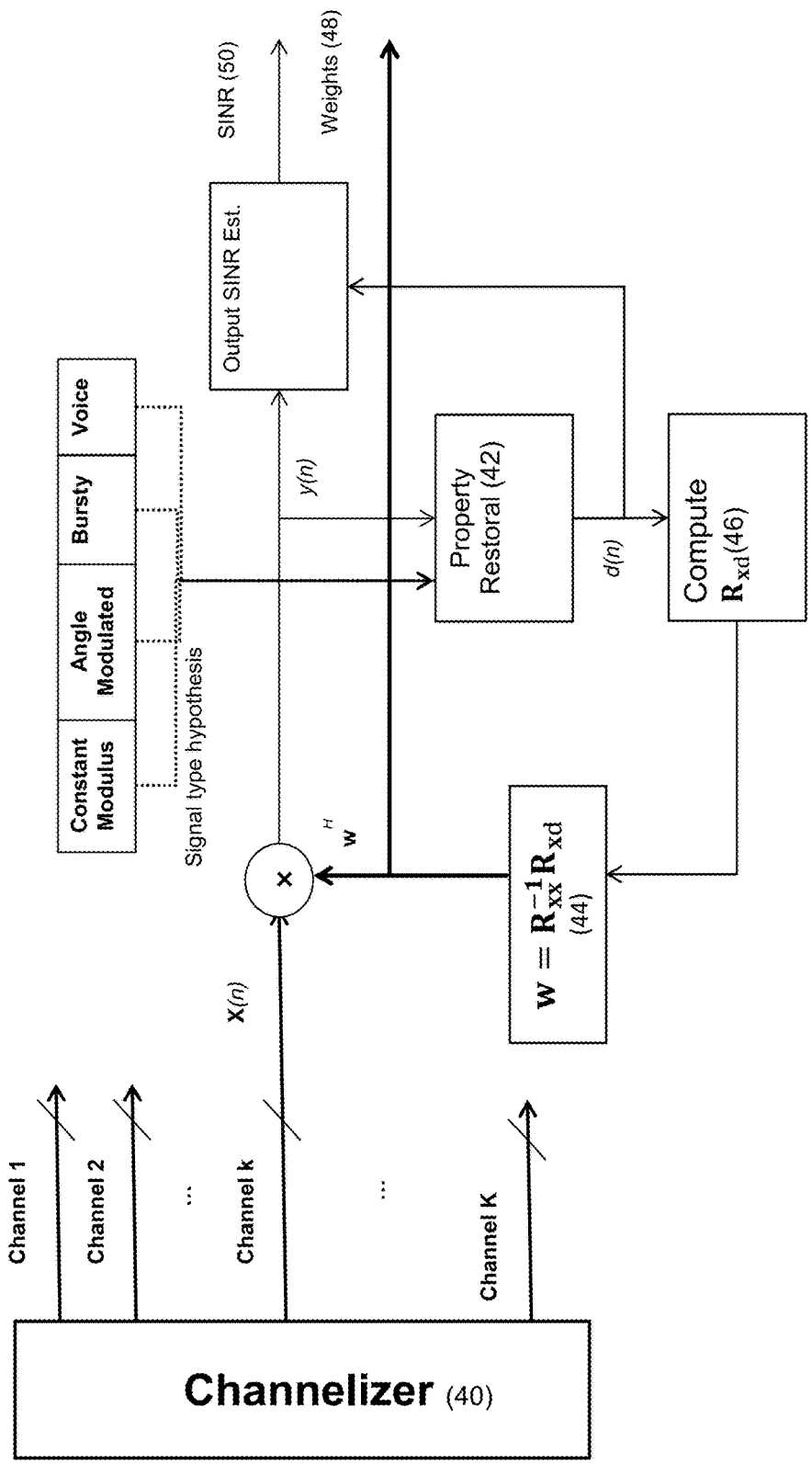
FIG. 6 shows a diagram of one embodiment of the copy aided geolocation system of the present disclosure using copy weights.

Referring to FIG. 6, a diagram of one embodiment of the system of the present disclosure using copy weights is shown. Here, a receive stare band (or the total frequencies detected by the system antenna receiver) is subdivided into K frequency subbands using a channelizer 40. The width of the various subbands is dependent on the signals of interest in the various bands under consideration. Multi-channel data from each of the K subbands is processed recursively using the variety of property restoral algorithms available 42; constant modulus, burst signal, angle modulation, voice or the like. At each step, new copy weights 44 are computed and reapplied to the data stream, and another iteration of the property restoral algorithm is applied to the data. SINR statistics 46 are computed and used to determine algorithm convergence. The copy output weights 48 and SINR data matrix 50 for each detected signal are outputs to the CAGL geolocation algorithm.

Figure 7:
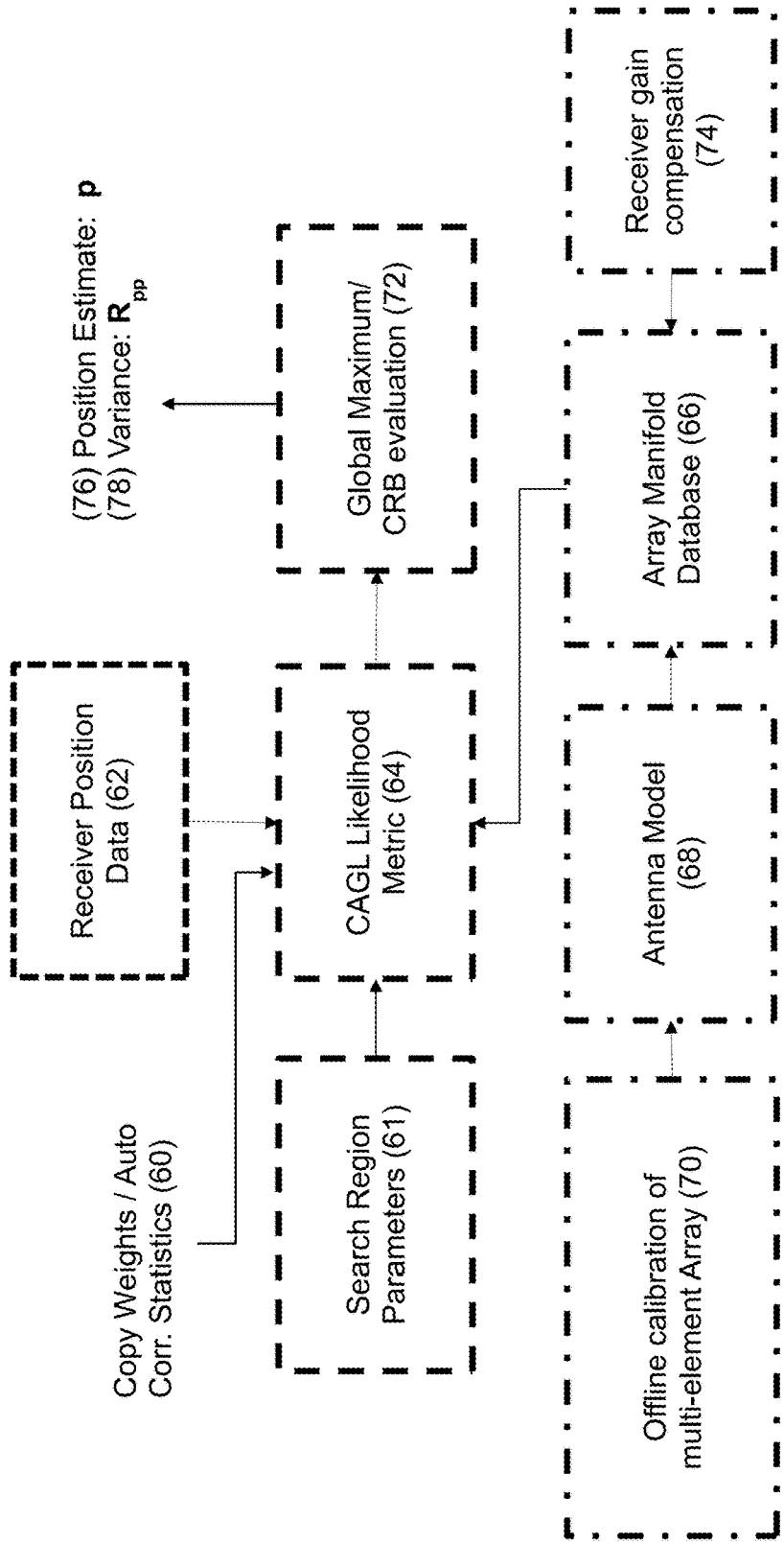
FIG. 7 shows a diagram of one embodiment of copy aided geolocation system according to the principles of the present disclosure.

Referring to FIG. 7, a diagram of one embodiment of the copy aided geolocation system of the present disclosure is shown. A series of copy weight and autocorrelation statistics 60 and platform location and attitude data 62 are used to compute the CAGL likelihood metric 64 over a specified search range 61. The CAGL likelihood metric 64 uses a calibration database 66 for the platform receive antenna array (which is computed off-line 70) using an antenna model 68 created from a combination of airborne, antenna range, and model data 74. The global maximum and Cramer-Rao bound (CRB) evaluation 72 provides a maximum value of the CAGL likelihood as the target location estimate 76 along with location uncertainty estimates 78 provided by the Cramer-Rao bound estimate.

Figure 8:
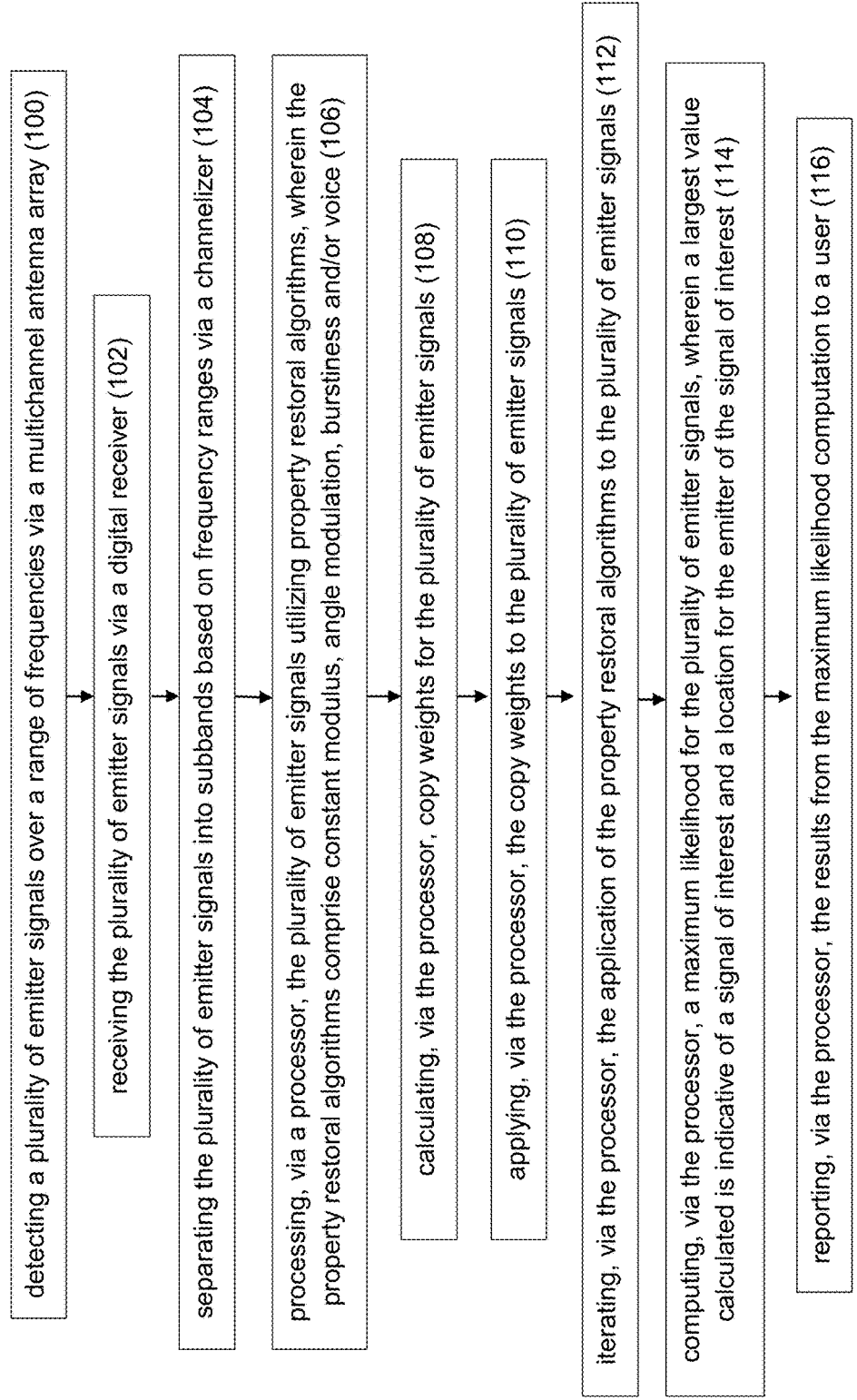
FIG. 8 shows a flowchart of one embodiment of the method of copy aided geolocation according to the principles of the present disclosure.

Referring to FIG. 8, a flowchart of one embodiment of the method of copy aided geolocation according to the principles of the present disclosure is shown. More specifically, the method detects a plurality of emitter signals over a range of frequencies via a multichannel antenna array 100. The plurality of emitter signals are received via a digital receiver 102 and a channelizer separates the plurality of emitter signals into subbands based on frequency ranges 104. A processor processes the plurality of emitter signals utilizing property restoral algorithms, wherein the property restoral algorithms comprise constant modulus, angle modulation, burstiness and/or voice 106. Property restoral algorithms are a class of adaptive algorithms that are used to combat the effects of multipaths and interferers. The processor also calculates copy weights for the plurality of emitter signals 108 and applies the copy weights to the plurality of emitter signals 110. This process is iterated 112 and a maximum likelihood for the plurality of emitter signals is calculated, wherein a largest value calculated is indicative of a signal of interest and a location for the emitter of the signal of interest 114. Once a geolocation has been determined, the results are reported to a user or system component 116. The system component includes, for example, a display, an electronic-counter measures system, an electronic attack system and the like. The user in this example can be a person on an airborne vehicle such as the pilot, navigator, or weapons person. It may also be processed for by other airborne vehicles, unmanned aerial vehicles, ground vehicles, ships and the like. In some cases, the geolocation refers to a target emitter in a military application. In other cases, the signal may refer to the location of a package within a building. There are numerous additional applications of the methodology of the present disclosure.

A computer readable medium as used herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of geolocation in a cochannel signal environment comprising
    detecting a plurality of emitter signals over a range of frequencies via a multichannel antenna array;
    receiving the plurality of emitter signals via a digital receiver;
    separating the plurality of emitter signals into subbands based on frequency ranges via a channelizer;
    processing, via at least one processor, the plurality of emitter signals utilizing property restoral algorithms, wherein the property restoral algorithms comprise constant modulus, angle modulation, burstiness and/or voice;
    calculating, via the processor, copy weights for the plurality of emitter signals;
    applying, via the processor, the copy weights to the plurality of emitter signals;
    iterating, via the processor, the application of the property restoral algorithms to the plurality of emitter signals;
    computing, via the processor, a maximum likelihood for the plurality of emitter signals, wherein a largest value calculated is indicative of a signal of interest and a location for the emitter of the signal of interest; and
    reporting, via the processor, the results from the maximum likelihood computation to a user or system component.

2. The method of geolocation in a cochannel signal environment of claim 1, wherein the multichannel antenna array is mounted to a moving platform.

3. The method of geolocation in a cochannel signal environment of claim 2, wherein computing a maximum likelihood for the plurality of emitter signals further comprises utilizing platform location and attitude data corresponding to detection of the plurality of emitter signals.

4. The method of geolocation in a cochannel signal environment of claim 1, further comprising calibrating the multichannel antenna array.

5. The method of geolocation in a cochannel signal environment of claim 1, wherein the plurality of emitter signals is assumed to comprise a signal of interest and another signal comprised of all other signals detected in the cochannel signal environment.

6. The method of geolocation in a cochannel signal environment of claim 1, wherein the location for the emitter of the signal of interest adheres to a lower Cramer-Rao bound than correlation interferometry geolocation.

7. A system for geolocation in a cochannel signal environment comprising
    a multichannel antenna array configured to detect a plurality of emitter signals over a range of frequencies;
    a digital receiver for receiving the plurality of emitter signals;
    a channelizer for separating the plurality of emitter signals into subbands based on frequency ranges;
    at least one processor configured to
        utilize property restoral algorithms to process the plurality of emitter signals, wherein the property restoral algorithms comprise constant modulus, angle modulation, burstiness and/or voice;
        calculate copy weights for the plurality of emitter signals;
        apply the copy weights to the plurality of emitter signals;
        iterate the application of the property restoral algorithms to the plurality of emitter signals;
        compute a maximum likelihood for the plurality of emitter signals, wherein a largest value calculated is indicative of a signal of interest and a location for the emitter of the signal of interest; and
        report the results from the maximum likelihood computation to a user or system component.

8. The system for geolocation in a cochannel signal environment of claim 7, wherein the multichannel antenna array is mounted to a moving platform.

9. The system for geolocation in a cochannel signal environment of claim 8, wherein computing a maximum likelihood for the plurality of emitter signals, via the processor, further comprises utilizing platform location and attitude data corresponding to detection of the plurality of emitter signals.

10. The system for geolocation in a cochannel signal environment of claim 7, further comprising calibrating the multichannel antenna array off-line.

11. The system for geolocation in a cochannel signal environment of claim 7, wherein the plurality of emitter signals is assumed to comprise a signal of interest and another signal comprised of all other signals detected in the cochannel signal environment.

12. The system for geolocation in a cochannel signal environment of claim 7, wherein the location for the emitter of the signal of interest adheres to a lower Cramer-Rao bound than correlation interferometry geolocation.

* * * * *